United States Patent
Takahashi et al.

(10) Patent No.: US 10,279,846 B2
(45) Date of Patent: May 7, 2019

(54) REAR END STRUCTURE OF VEHICLE BODY

(71) Applicant: HONDA MOTOR CO., LTD., Minato-ku, Tokyo (JP)

(72) Inventors: Koichi Takahashi, Wako (JP); Satoru Kawabe, Wako (JP); Ken Yasui, Wako (JP); Masaaki Yamane, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/548,978

(22) PCT Filed: Feb. 10, 2015

(86) PCT No.: PCT/JP2015/053702
§ 371 (c)(1),
(2) Date: Aug. 4, 2017

(87) PCT Pub. No.: WO2016/129065
PCT Pub. Date: Aug. 18, 2016

(65) Prior Publication Data
US 2018/0029650 A1 Feb. 1, 2018

(51) Int. Cl.
*B62D 25/20* (2006.01)
*B62D 43/10* (2006.01)

(52) U.S. Cl.
CPC ......... *B62D 25/20* (2013.01); *B62D 25/2027* (2013.01); *B62D 43/10* (2013.01)

(58) Field of Classification Search
CPC .... B62D 25/08; B62D 25/20; B62D 25/2027; B62D 43/10

USPC ................. 296/37.2, 187.08, 187.11, 193.08
See application file for complete search history.

(56) References Cited

U.S. PATENT DOCUMENTS

2010/0052368 A1 * 3/2010 Yamaguchi .......... B62D 25/087
296/203.04

FOREIGN PATENT DOCUMENTS

| DE | 102006047422 A1 * | 4/2008 | .......... B62D 25/087 |
| JP | H05-201356 A | 8/1993 | |
| JP | 2010241176 A * | 10/2010 | |
| JP | 5082791 B2 | 11/2012 | |

OTHER PUBLICATIONS

English translation of JP 2010-241176; retreived on Sep. 4, 2018 via J-Plat-Pat located at https://www4.j-platpat.inpit.go.jp/eng/tokujitsu/tkbs_en/TKBS_EN_GM101_Top.action. (Year: 2018).*

(Continued)

*Primary Examiner* — Jason S Daniels
(74) *Attorney, Agent, or Firm* — Carrier Blackman & Associates, P.C.; William D. Blackman; Joseph P. Carrier

(57) ABSTRACT

Provided is a rear end structure of a vehicle body, with which it is possible to reduce vehicle weight and achieve satisfactory vehicle body rigidity. The rear end structure of a vehicle body is equipped with a floor panel having a low floor part, a high floor part provided rearward of the low floor part, and a floor recess formed in the high floor part and describing a protuberant configuration when viewed in the longitudinal direction of the vehicle, and a brace connecting the low floor part and the bottom surface of the floor recess.

15 Claims, 6 Drawing Sheets

(56) References Cited

OTHER PUBLICATIONS

English translation of JP H05-201356; retreived on Sep. 4, 2018 via J-Plat-Pat located at https://www4.j-platpat.inpit.go.jp/eng/tokujitsu/tkbs_en/TKBS_EN_GM101_Top.action. (Year: 2018).*
Office Action dated Oct. 16, 2018, issued in the corresponding Chinese Patent Application 201580075705.2.

* cited by examiner

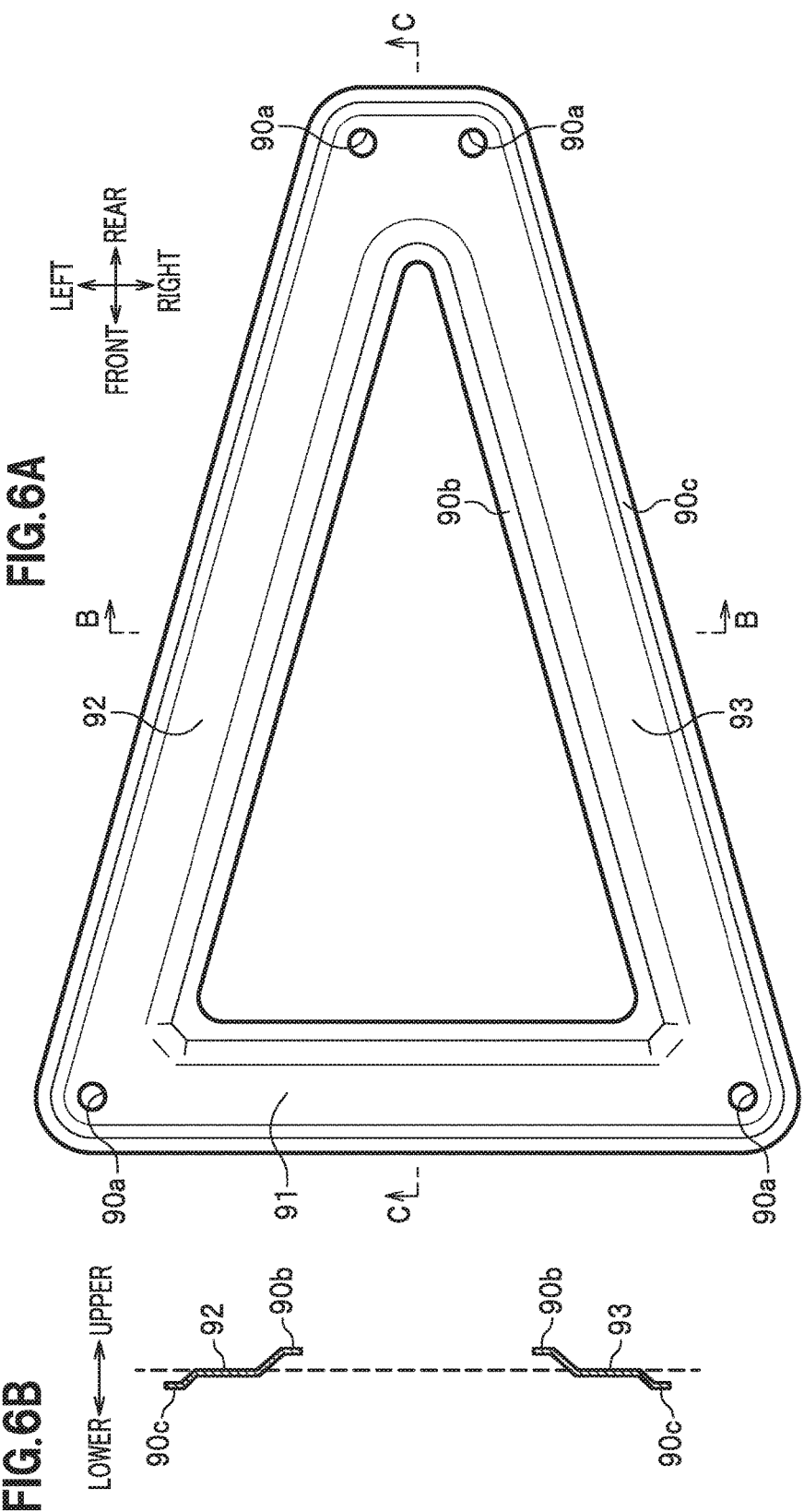
FIG.6A
FIG.6B
FIG.6C

REAR END STRUCTURE OF VEHICLE BODY

TECHNICAL FIELD

The present invention relates to a rear end structure of a vehicle body.

BACKGROUND ART

As a conventional structure for improving the stiffness of the rear end portion of a vehicle body, Patent Document 1 (Japanese Patent No. 5082791) discloses a structure provided with braces connecting left and right rear side frames and a floor frame provided on a floor located anterior and inferior to a rear frame.

RELATED ART DOCUMENT

Patent Document

Patent Document 1: Japanese Patent No. 5082791

DISCLOSURE OF THE INVENTION

Problem to be Solved by the Invention

As the structure described in Patent Document 1, has a brace that connects the rear frame and the floor frame, there was a problem that the brace becomes long and the weight of the vehicle body increases.

The present invention has been developed to address the above point, and an object of the invention is to provide a rear end structure of a vehicle body enabling reduction of the weight of the vehicle body and realizing an excellent vehicle body stiffness.

Means for Solving the Problem

In order to attain the above object, a rear end structure of a vehicle body, according to the invention includes: a floor panel including a low floor portion, a high floor portion provided posterior to the low floor portion, and a floor recess portion being formed on the high floor portion and having a downward convex shape in a view in a vehicle front-rear direction; and a brace connecting the low floor portion and a bottom surface of the floor recess portion.

By this structure, as the brace connects the low floor portion and the bottom surface of the floor recess portion, it is possible to shorten the brace and reduce the weight of the vehicle body.

Further, as the brace connects the low floor portion and the bottom surface of the floor recess portion, it is possible to improve the stiffness of the vehicle body, using the shear force of the floor panel.

Still further, by using the floor panel, which is conventionally not a frame member, to improve the stiffness of a vehicle body similarly to a frame member, it is possible to reduce the weight of the rear frame and the like, which are frame members, and further reduce the weight of the entire vehicle body.

The low floor portion, the brace, and the bottom surface of the floor recess portion are disposed preferably at the same height in a view from a side of the vehicle body and substantially linearly.

In this aspect of the invention, the meaning of 'substantially linear disposition' includes, in addition to a case that neighboring surfaces are disposed on a line, a case that neighboring surfaces are disposed substantially on a line such that end portions thereof are superposed.

By this structure, as the brace substantially horizontally connects the low floor portion and the bottom surface of the floor recess portion, it is possible to shorten the brace to thereby reduce the weight of the vehicle body, and ensure enough clearance between the suspensions of wheels and the brace to thereby prevent interference between the suspensions and the brace.

It is preferable that the floor panel includes a step portion formed at a rear end portion of the low floor portion, and located higher than the low floor portion and lower than the high floor portion; the rear end structure of a vehicle body includes a front stiffener including a fastening portion at the same height as the low floor portion and forming a closed cross-section with the step portion to house a fastening member; and the brace and the fastening portion of the front stiffener are fastened by the fastening member.

By this structure, the stiffness of the connection portion of the brace can be locally improved, and the stiffness of the vehicle body can be improved, by more satisfactorily using the shear force of the floor panel.

Further, it is possible to prevent entrance of water into the vehicle interior side, by a simple structure without the necessity of sealing.

It is preferable that the rear end structure of a vehicle body includes a rear stiffener forming a closed cross-section with the bottom surface of the floor recess portion to house a fastening member, and the brace and the rear stiffener are fastened by the fastening member.

By this structure, the stiffness of the connection portion of the brace can be locally improved, and the stiffness of the vehicle body can be improved, by more satisfactorily using the shear force of the floor panel.

Further, it is possible to prevent entrance of water into the vehicle interior side, by a simple structure without the necessity of sealing.

It is preferable that the floor panel includes a floor tunnel being extended at a central portion, in vehicle transverse direction, of the low floor portion and having an upward convex shape in a view along a vehicle front and rear direction; the low floor portion is partitioned by the floor tunnel into a left low floor portion and a right low floor portion; the brace includes a tunnel brace connecting the left low floor portion and the right low floor portion, a left brace connecting the left low floor portion and the bottom surface of the floor recess portion, and a right brace connecting the right low floor portion and the bottom surface of the floor recess portion; and the left brace and the right brace are disposed left-right symmetric.

By this structure, as the tunnel brace is provided, the floor tunnel can be prevented from opening.

Further, as the left brace and the right brace are disposed left-right symmetrically, bending in the upper-lower direction of the vehicle body caused by a left-right asymmetric damper input can be satisfactorily reduced.

It is preferable that the brace has a triangle truss shape in integration of the tunnel brace, the left brace, and the right brace; and the corners of the triangle truss shape are connected respectively to a right rear end portion of the left low floor portion, a left rear end portion of the right low floor portion, and a front end portion of the bottom surface of the floor recess portion.

By this structure, as the brace has an integrated triangle truss shape, the number of components and the number of assembling processes can be reduced.

Further, as the brace has an integrated triangle truss shape, it is possible to even more satisfactorily prevent the floor tunnel from opening, and upper-lower bending and torsion of the vehicle body can be even more satisfactorily reduced.

Further, as the brace has an integrated triangle truss shape, the brace can be more compacted, compared with a case that the tunnel brace, the left brace, and the right brace are separated from each other, and it is thereby possible to improve the degree of freedom of the layout of the suspensions.

The brace preferably has a plate shape.

By this structure, as the cross-sectional principal axis of the brace and the cross-sectional principal axis of the floor panel are not offset, compared with a conventional pipe shaped brace, occurrence of local bending moment can be prevented by the brace, which is light in weight and inexpensive, and the stiffness of the vehicle body can be improved.

It is preferable that the brace is connected to the low floor portion and the bottom surface of the floor recess portion by fastening members; and the brace in the plate shape includes a flange portion extended between fastening portions to the high floor portion side.

By this structure, as the brace has the flange portion, the stiffness of the entire brace can be improved. Besides, in the event that a load input from the road surface has caused an upward bending moment (a moment that bends the brace into a U-shape in side view) on the brace, it is possible to make the flange portion generate an inverse bending moment to cancel the upward bending moment.

Advantage of the Invention

According to the present invention, the weight of a vehicle body can be reduced, and an excellent vehicle body stiffness can be realized.

BRIEF DESCRIPTION OF THE DRAWINGS

FIG. 6A is an enlarged view of a brace, FIG. 6B is a cross-sectional view taken along arrow B-B in FIG. 6A, and FIG. 6C is a cross-sectional view taken along arrow C-C in FIG. 6A.

EMBODIMENT FOR CARRYING OUT THE INVENTION

Figure 1:
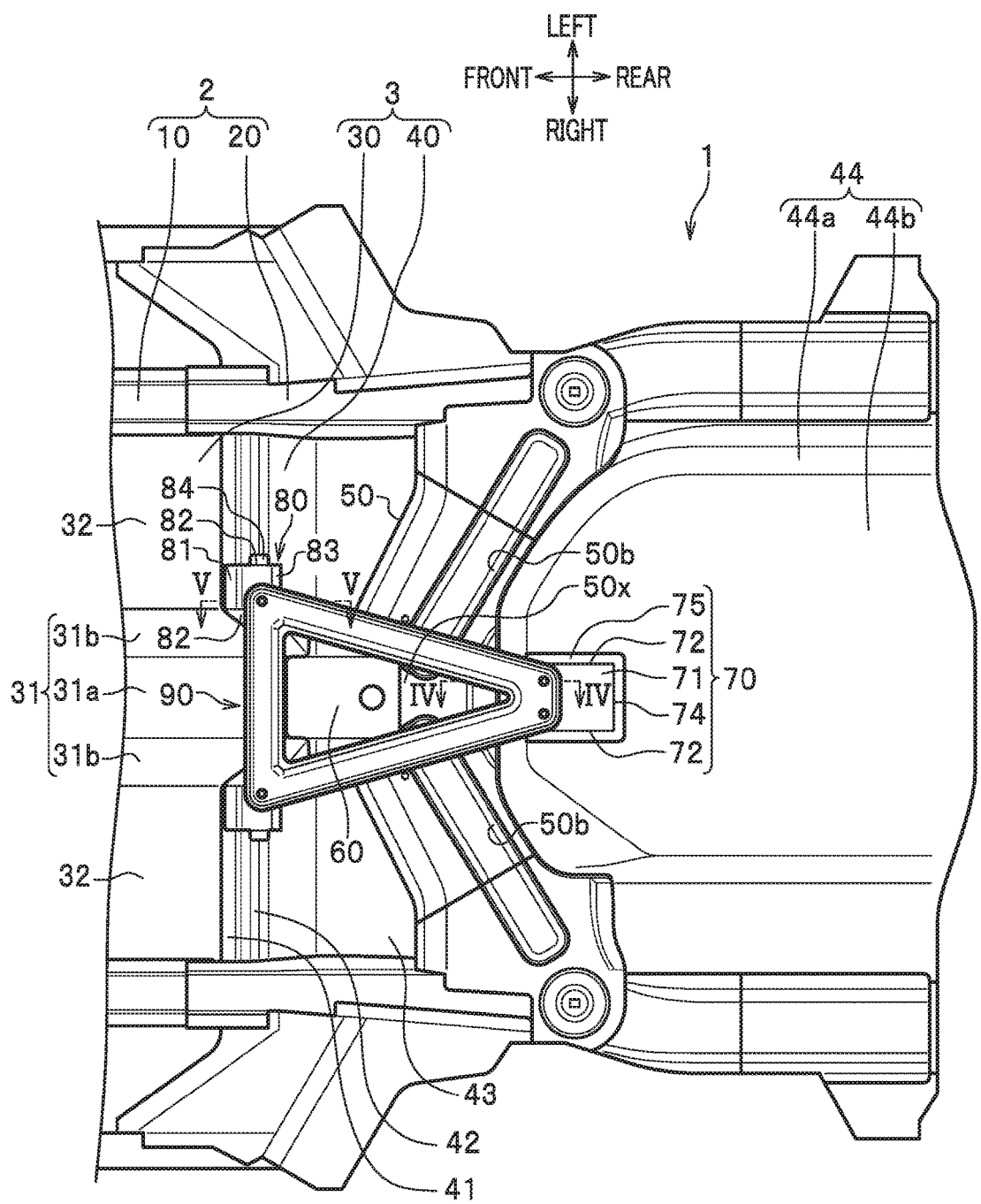
FIG. 1 is a bottom view showing a rear end structure, of a vehicle body, according to an embodiment of the present invention.

An embodiment of the present invention will be described in detail, referring to the drawings. In the description, the same symbol will be given to the same element, and overlapping description will be omitted. Incidentally, 'front-rear' shown by an arrow in the respective drawings represents the vehicular front-rear direction of a vehicle body: 'upper-lower' represents the upper-lower direction of the vehicle body; and 'left-right' represents the left-right direction (vehicle body transverse direction) in a view from the driver's seat.

Figure 2:
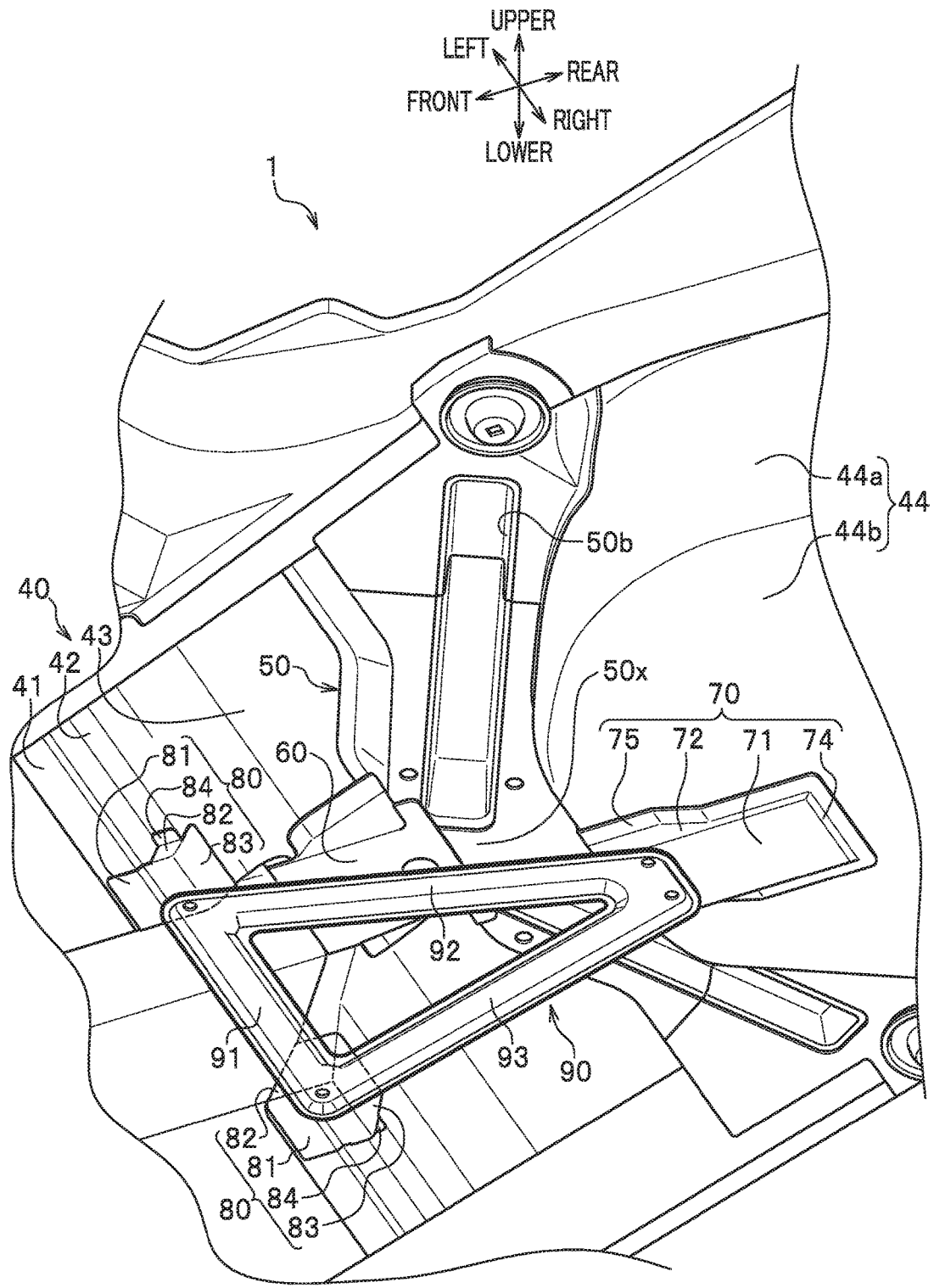
FIG. 2 is a perspective view showing the rear end structure, of a vehicle body, according to the embodiment of the present invention.
Figure 3:
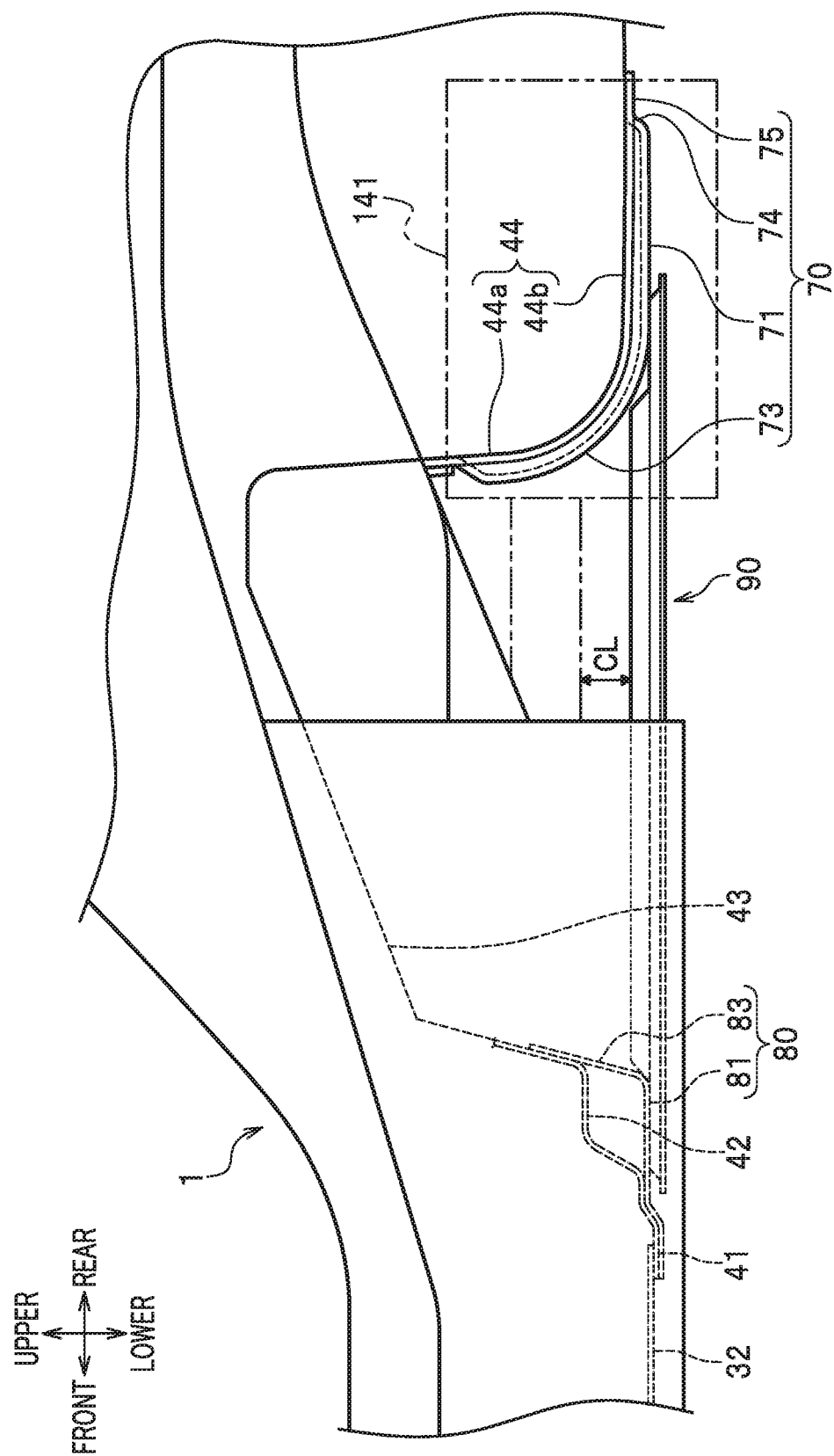
FIG. 3 is a perspective view showing the rear end structure, of a vehicle body, according to the embodiment of the present invention.

As shown in FIGS. 1 to 3, a vehicle-body rear portion structure 1 (in other words, a rear end structure 1 of a vehicle body) according to an embodiment of the invention is provided with left-right paired frames 2, a floor panel 3 arranged between the left-right paired frames 2, a rear cross member 50, a tunnel connecting portion 60, a rear stiffener 70, left-right paired front stiffeners 80, and a brace 90.

<Frame>

The left-right paired frames 2 are respectively extended in the front-rear direction. Each frame 2 is a metal member forming a closed cross-section in front view. The frame 2 is formed by joining a floor frame 10 at a front portion and a rear frame 20 at a rear portion by welding or the like. A wheel house is formed on the outer side of the rear frame 20, and a wheel is arranged inside the wheel house.

<Floor Panel>

The floor panel 3 is a flat-shaped metal member forming the floor surface of the vehicle body. The floor panel 3 is formed by joining a front floor panel 30 at the front portion and a rear floor panel 40 at the rear portion by welding or the like.

<Front Floor Panel>

The left and right end portions of the front floor panel 30 are joined to the floor frame 10 by welding or the like. The front floor panel 30 is provided with a floor tunnel 31 and left-right paired low floor portions 32.

<Floor Tunnel>

The floor tunnel 31 is extended in the front-rear direction at the central portion, with respect to the left-right direction, of the front floor panel 30. The floor tunnel 31 is formed by a top surface 31a and left-right paired side surfaces 31b, and has a convex shape upward in front view (namely in a view in the vehicle body front-rear direction). The rear end portion of the floor tunnel 31 is open at the rear end portion of the front floor panel 30.

The left-right paired low floor portions 32 are portions formed by partitioning the front floor panel 30 by the floor tunnel 31.

<Rear Floor Panel>

The left and right end portions of the rear floor panel 40 are joined with the respective rear frames 20 by welding or the like. The rear floor panel 40 is provided with a joining portion 41, a step portion 42, a high floor portion 43, and a floor recess portion 44 in this order from the front side.

The joining portion 41 is the front end portion of the rear floor panel 40 and is joined with the lower surface of the rear end portion of the front floor panel 30 by welding or the like such as to be overlapped. The step portion 42 is formed posterior to the joining portion 41 such as to be slightly higher than the joining portion 41. In other words, the step portion 42 is at a height higher than the low floor portion 32 and lower than the high floor portion 43. The joining portion 41 and the step portion 42 are divided to the left and the right, corresponding to the floor tunnel 31.

The high floor portion 43 is formed posterior to the step portion 42 such as to be higher than the top surface 31a of the floor tunnel 31. The floor recess portion 44 is formed at a portion of the high floor portion 43, the portion being posteriorly distant from the step portion 42 of the high floor portion 43. The floor recess portion 44 is formed by side surfaces 44a and a bottom surface 44b, having a convex shape downward in front view. The bottom surface 44b of the floor recess portion 44 is formed at a height substantially the same as the height of the left-right paired low floor portions 32 of the front floor panel 30. The floor recess portion 44 is used as a housing portion, for example, for a spare tire, a battery, and the like.

<Rear Cross Member>

The rear cross member 50 is formed such as to bridge the left-right paired frames 2 (the left-right paired rear frames 20 in the present embodiment) under the high floor portion 43. The rear cross member 50 is a metal member in a V-shape having a top on the vehicle body front side in plan view. In other words, the rear cross member 50 extended such that a central top point 50x is located the most anterior, and the closer a point on the rear cross member 50 is to the left or right end portion away from the top point 50x, the more posterior the position is. The left and right end portions of the rear cross member 50 are connected to the left-right paired rear frames 20. The rear cross member 50 is provided with left-right paired groove portions 50b.

The left-right paired groove portions 50b are extended from the top point 50x side of the rear cross member 50 toward the respective end portion sides, forming a convex shape upward in side view. The each groove portion 50b is extended such that the closer a point thereon is located to the end portion side away from the top point 50x side, the posterior the point is.

<Tunnel Connecting Portion>

The tunnel connecting portion 60 is a metal member connecting the top surface 31a of the floor tunnel 31 and the bottom surface, at the top, of the rear cross member 50.

<Rear Stiffener>

The rear stiffener 70 is a metal member arranged at the central portion, with respect to the vehicle body left-right direction, on the lower side of the front end portion of the bottom surface 44b of the floor recess portion 44, (the central portion being posterior to the floor tunnel 31 in the present embodiment). The rear stiffener 70 is in a box shape integrally having a bottom surface 71, left-right paired side surfaces 72 extended upward from the left and right end portions of the bottom surface 71, a front surface 73 extended upward from the front end portion of the bottom surface 71, a rear surface 74 extended upward from the rear end portion of the bottom surface 71, and a flange portion 75 extended outward from the upper end portions of the left-right paired side surfaces 72 and the rear surface 74. The rear stiffener 70 forms a closed cross-section, in front view, with the bottom surface 44b of the floor recess portion 44. In the present embodiment, the rear stiffener 70 forms a closed cross-section, also in front view, with the bottom surface 44b of the floor recess portion 44, and forms a closed space as a whole. In the present embodiment, although the rear stiffener 70 is connected at the front end portion thereof with the rear end portion, at the center with respect to the vehicle transverse direction, of the rear cross member 50, the rear stiffener 70 may be formed such that the front end portion thereof is formed short and is not connected with the rear cross member 50.

Figure 4:
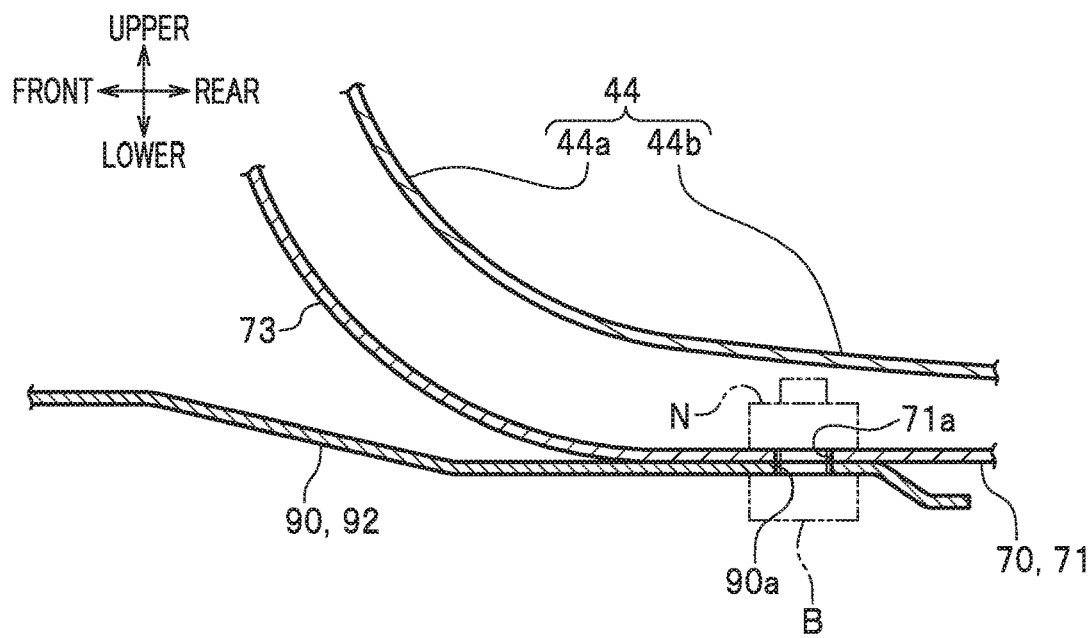
FIG. 4 is a cross-sectional view taken along arrow IV-IV in FIG. 1.

As shown in FIG. 4, the bottom surface 71 is provided with a hole portion 71a as a fastening portion through which a bolt B, which is a fastening member, is inserted. A nut N as a fastening portion is fixed on the upper surface side of the hole portion 71a.

<Front Stiffener>

As shown in FIGS. 1-3, each of left-right paired front stiffeners 80 is substantially in a box shape integrally provided with a bottom surface 81, left-right paired side surfaces 82 extended upward from the left and right end portions of the bottom surface 81, a rear surface 83 extended upward from the rear end portion of the bottom surface 81, and flange portions 84 extended outward from the upper end portions of the side surfaces 82, which is on the outer side in the vehicle transverse direction, and forms a closed cross-section, in side view, with the step portion 42. In the present embodiment, the front stiffeners 80 form a closed cross-section also in front view with the step portion 42 to form a closed space as a whole.

The left front stiffener 80 is arranged at the edge portion, namely the right rear end portion, of the left low floor portion 32, and the right front stiffener 80 is arranged at the edge portion, namely the left rear end portion, of the right low floor portion 32. The bottom surface 81 of the front stiffener 80 is arranged at the same height as the low floor portion 32.

The front end portion of the bottom surface 81 of the each front stiffener 80 is joined with the joining portion 41 by welding or the like. The side surface 82, on the transverse inner side, of the front stiffener 80 is joined with the side surface 31b of the floor tunnel 31 by welding or the like. The rear surface 83 of the front stiffener 80 is connected with the inclined surface, which is the front end portion, of the high floor portion 43 by welding or the like. The flange portion 84 of the front stiffener 80 is joined with the step portion 42 by welding or the like. Incidentally, the side surface 82 on the transverse outer side and the flange portion 84 can be omitted from the front stiffener 80.

Figure 5:
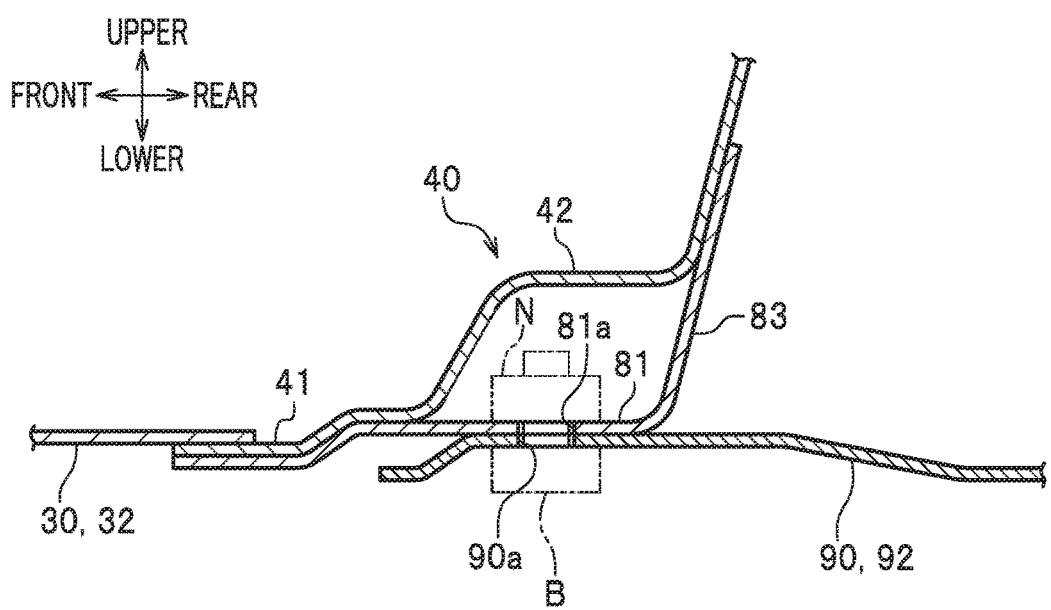
FIG. 5 is a cross-sectional view taken along arrow IV-IV in FIG. 1.

As shown in FIG. 5, the bottom surface 81 is provided with a hole portion 81a as a fastening portion through which a bolt B, which is a fastening member, is inserted, and a nut N as a fastening portion is fixed on the upper surface side of the hole portion 81a. Incidentally, in the figures other than FIGS. 4 and 5, the bolt B and the nut N are omitted.

<Brace>

As shown in FIGS. 1-3, the brace 90 is a metal member for connecting the low floor portions 32 and the bottom surface 44b of the floor recess portion 44. The brace 90 is disposed at the same height as the low floor portions 32 and the bottom surface 44b of the floor recess portion 44 and substantially linearly. The brace 90 is a member for preventing opening between the low floor portion 32 and the floor recess portion 44 bridged by the brace 90 to thereby increase the stiffness of the floor panel 3.

As shown in FIG. 6, the brace 90 is in a plate and triangle truss shape, in plan view, and is integrally provided with a tunnel brace 91, a left brace 92, and a right brace 93. The brace 90 is an isosceles triangle in which the left brace 92 and the right brace 93 are disposed left-right symmetrically.

The tunnel brace 91 is a portion for bridging the left-right paired low floor portions 32 in the transverse direction to thereby connect these, left-right paired low floor portions 32 being the left-right paired front stiffeners 80 in the present embodiment. The left brace 92 is a portion arranged such as to bridge the left low floor portion 32 (the left front stiffener 80 in the present embodiment) and the front end portion of the bottom surface 44b of the floor recess portion 44 (the rear stiffener 70 in the present embodiment) obliquely in plan view to thereby connect these. The right brace 93 is a portion arranged such as to bridge the right low floor portion 32 (the right front stiffener 80 in the present embodiment) and the front end portion of the bottom surface 44b of the floor recess portion 44 (the rear stiffener 70 in the present embodiment) obliquely in plan view to thereby connect these.

The left brace 92 and the right brace 93 are disposed at positions overlapping with the vehicle transverse inner side end portions of the grooves 50b, which are in a left-right pair in plan view. The lower arms of suspensions 141 (see FIG. 3) for wheels are fitted to the left-right paired groove portions 50b, however, these suspensions 141 are disposed above the left brace 92 and the right brace 93 and accordingly do not interfere with the left brace 92 nor the right brace 93.

In such a vehicle-body rear portion structure 1, in the event that a force in a torsional direction is caused, for example by driving vibration, on the left and right low floor portions 32 and the bottom surface 44b of the floor recess portion 44, it is possible to satisfactorily prevent generation of torsion as the stiffness of these is increased by the brace 90.

The respective corners of the brace 90 in a triangle truss shape, in other words, the connecting portions of the tunnel brace 91, the left brace 92, and the right brace 93 are provided with hole portions 81a as fastening portions through which bolts B, which are fastening members, are inserted.

As shown in FIG. 4, two hole portions 90a formed at the rear corners of the brace 90 are superimposed with the hole portions 71a formed through the bottom surface 71 of the rear stiffener 70. The rear end portion of the brace 90 is fastened to the rear stiffener 70 by bolts B, which are fastening members inserted through the hole portions 90a and 71a to be screw-engaged with nuts N. The tip ends of the shaft portions of the bolts B are housed in the closed cross-sections formed between the rear stiffener 70 and the bottom surface 44b of the floor recess portion 44.

Further, as shown in FIG. 5, the hole portions 90a formed at the two corners on the front side of the brace 90 are superimposed with the hole portions 81a provided through the bottom surfaces 81 of the respective front stiffeners 80. The front end portion of the brace 90 is fastened to the front stiffeners 80 by bolts B, which are fastening members inserted through the hole portions 90a and 81a to be screw-engaged with nuts N. The tip ends of the shaft portions of the bolts B are housed in closed cross-sections formed between the front stiffener 80 and the step portion 42.

Further, as shown in FIG. 6, the brace 90 has a flange portion 90b extended between fastening portions, in the present embodiment, extended from the inner end portion of the triangle truss shape to the high floor portion 43 side. In the present embodiment, the flange portion 90b has a triangle frame shape in plan view.

Further, the brace 90 has a flange portion 90c extended downward from the outer end portion of the triangle truss shape. In the present embodiment, the flange portion 90c is in a triangle frame shape in plan view. This flange portion 90c is a portion for preventing the brace 90 from interfering with surrounding members (particularly the front stiffeners 80 and the rear stiffener 70).

The vehicle-body rear portion structure 1 in the present embodiment of the invention connects, as shown in FIG. 3, the low floor portions 32 and the bottom surface 44b of the floor recess portion 44, it is thereby possible to shorten the brace 90 and reduce the weight of the vehicle body.

Further, for the vehicle-body rear portion structure 1, as the brace 90 connects the low floor portions 32 and the bottom surface 44b of the floor recess portion 44, it is possible to improve the stiffness of the vehicle body, using the shear force of the floor panel 3.

Still further, for the vehicle-body rear portion structure 1, by using the floor panel 3, which is conventionally not a frame member, to improve the stiffness of a vehicle body similarly to a frame member, it is possible to reduce the weight of the rear frame 20 and the like, which are frame members, and further reduce the weight of the entire vehicle body.

Yet further, as the vehicle-body rear portion structure 1 is structured such that the brace 90 substantially horizontally connects the low floor portions 32 and the bottom surface 44b of the floor recess portion 44, it is possible to shorten the brace 90 to thereby reduce the weight of the vehicle body, and ensure enough clearance CL between the suspensions 141 and the brace 90 to thereby prevent interface between the suspensions 141 of wheels and the brace 90.

Further, as the vehicle-body rear portion structure 1 is structured such that the brace 90 is connected to the floor panel 3 through the rear stiffener 70 and the front stiffeners 80, the stiffness of the connection portion of the brace can be locally improved, and the stiffness of the vehicle body can be improved, by more appropriately using the shear force of the floor panel 3.

Still further, as the vehicle-body rear portion structure 1 is structured such that as the brace 90 is connected to the floor panel 3 through the rear stiffener 70 and the front stiffeners 80, it is possible to prevent entrance of water into the vehicle interior side, by a simple structure without the necessity of sealing.

Yet further, as the vehicle-body rear portion structure 1 is provided with the tunnel brace 91, the floor tunnel 31 can be prevented from opening.

Further, as the vehicle-body rear portion structure 1 is structured such that the left brace 92 and the right brace 93 are disposed left-right symmetrically, bending in the upper-lower direction of the vehicle body caused by a left-right asymmetric damper input can be satisfactorily reduced.

Still further, as the vehicle-body rear portion structure 1 is structured such that the brace 90 has an integrated triangle truss shape, the number of components and the number of assembling processes can be reduced.

Yet further, as the vehicle-body rear portion structure 1 is structured such that the brace 90 has an integrated triangle truss shape, it is possible to even more satisfactorily prevent the floor tunnel 31 from opening, and upper-lower bending and torsion of the vehicle body can be even more satisfactorily reduced.

Yet further, as the vehicle-body rear portion structure 1 is structured such that the brace 90 has an integrated triangle truss shape, the brace 90 can be more compacted, compared with a case that the tunnel brace 91, the left brace 92, and the right brace 93 are separated from each other, and it is thereby possible to improve the degree of freedom of the layout of the suspensions 141.

Further, as the vehicle-body rear portion structure 1 is structured such that the brace 90 has a plate shape. the brace 90 can be disposed such that the cross-sectional principal axis of the brace 90 and the cross-sectional principal axis of the floor panel 3 are not offset, compared with a conventional pipe shaped brace. Accordingly, occurrence of local bending moment can be prevented by the brace 90, which is light in weight and inexpensive, and the stiffness of the vehicle body can be improved.

Still further, as the vehicle-body rear portion structure 1 is structured such that the brace 90 has the flange portion 90b, the stiffness of the entire brace 90 can be improved. Besides, in the event that a load input from the road surface has caused an upward bending moment (a moment that bends the brace 90 into a U-shape in side view) on the brace 90, it is possible to make the flange portion 90b generate an inverse bending moment to cancel the upward bending moment.

<Modified Example>

Figure 7A:
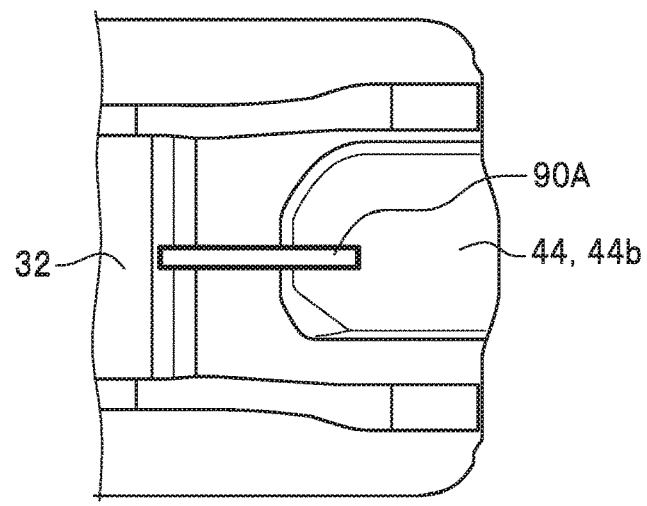
FIGS. 7A-7C are bottom views showing rear end structures, of vehicle bodies, according to modified examples of the present invention.

A brace 90 according to the present invention is not limited to the above-described triangle truss shape. For example, a brace 90A in a plate shape extending in the front-rear direction as shown in FIG. 7A may be structured such as to connect a low floor portion 32, which is not provided with a floor tunnel 31, and a bottom surface 44b of a floor recess portion 44.

Figure 7B:
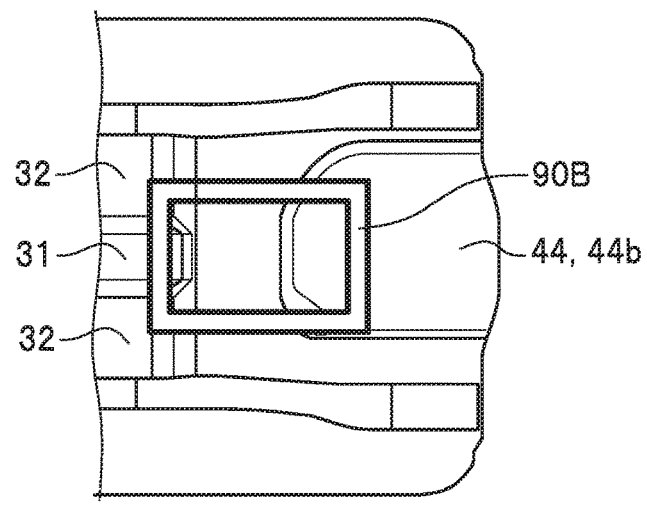

Further, as shown in FIG. 7B, a brace 90B may be structured in a plate and rectangular shape that is integrally provided with a tunnel brace connecting left-right low floor portions 32, a left brace connecting the left low floor portion 32 and the bottom surface 44b of a floor recess portion 44, a right brace connecting the right low floor portion 32 and the bottom surface 44b of the floor recess portion 44, and a rear end brace connecting the rear end portions of the left brace and the right brace.

Figure 7C:
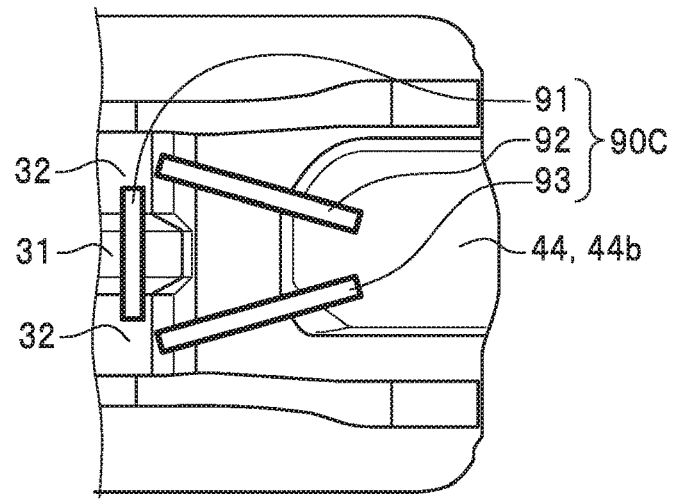

Still further, as shown in FIG. 7C, a brace 90C may be structured such as to be separately provided with the above-described tunnel brace 91, the left brace 92 and the right brace 93.

An embodiment and modified examples according to the invention have been described above, however, the present invention is not limited thereto and can be modified and changed, as appropriate, in a range without departing from the spirit of the invention. For example, a floor panel 3 is not limited to the structure connecting a floor frame 10 and a rear frame 20, and may have a structure where the entire floor panel 3 is integrally formed.

DESCRIPTION OF REFERENCE SYMBOLS

1: vehicle-body rear portion structure
2: frame
3: floor panel
10: floor frame
20: rear frame
30: front floor panel
31: floor tunnel
32: low floor portion
40: rear floor panel
41: joining portion
42: step portion
43: high floor portion
44: floor recess portion
44b: bottom surface
70: rear stiffener
71a: hole portion (fastening portion)
80: front stiffener
81a: hole portion (fastening portion)
90, 90A, 90B, 90C: brace
91: tunnel brace
92: left brace
93: right brace
B: bolt (fastening member)
N: nut (fastening portion)

The invention claimed is:

1. A rear end structure of a vehicle body, comprising:
a floor panel including a low floor portion, a high floor portion provided rearward of the low floor portion, and a floor recess portion formed on the high floor portion and having a downward convex shape in a view in a vehicle longitudinal direction;
a front stiffener; and
a brace connecting the low floor portion and a bottom surface of the floor recess portion;
wherein the floor panel includes a step portion formed at a rear end portion of the low floor portion, and located higher than the low floor portion and lower than the high floor portion,
wherein the front stiffener includes a fastening portion disposed at the same height as the low floor portion and forming a closed cross-section with the step portion to house a fastening member,
and wherein the brace and the fastening portion of the front stiffener are fastened by the fastening member.

2. The rear end structure of the vehicle body according to claim 1, wherein the low floor portion, the brace, and the bottom surface of the floor recess portion are disposed at the same height in a view from a side of the vehicle body and substantially linearly.

3. The rear end structure of the vehicle body according to claim 2, further comprising:
a rear stiffener forming a closed cross-section with the bottom surface of the floor recess portion to house a second fastening member,
wherein the brace and the rear stiffener are fastened by the second fastening member.

4. The rear end structure of the vehicle body according to claim 2,
wherein the floor panel includes a floor tunnel being extended at a central portion, in vehicle transverse direction, of the low floor portion and having an upward convex shape in a view along a vehicle front and rear direction,
wherein the low floor portion is partitioned by the floor tunnel into a left low floor portion and a right low floor portion,
wherein the brace comprises:
a tunnel brace connecting the left low floor portion and the right low floor portion;
a left brace connecting the left low floor portion and the bottom surface of the floor recess portion; and
a right brace connecting the right low floor portion and the bottom surface of the floor recess portion,
and wherein the left brace and the right brace are disposed left-right symmetric.

5. The rear end structure of the vehicle body according to claim 2, wherein the brace has a plate shape.

6. The rear end structure of the vehicle body according to claim 1, further comprising:
a rear stiffener forming a closed cross-section with the bottom surface of the floor recess portion to house a second fastening member,
wherein the brace and the rear stiffener are fastened by the second fastening member.

7. The rear end structure of the vehicle body according to claim 6,
wherein the floor panel includes a floor tunnel being extended at a central portion, in vehicle transverse direction, of the low floor portion and having an upward convex shape in a view along a vehicle front and rear direction,
wherein the low floor portion is partitioned by the floor tunnel into a left low floor portion and a right low floor portion,
wherein the brace comprises:
a tunnel brace connecting the left low floor portion and the right low floor portion;

a left brace connecting the left low floor portion and the bottom surface of the floor recess portion; and a right brace connecting the right low floor portion and the bottom surface of the floor recess portion, and wherein the left brace and the right brace are disposed left-right symmetric.

8. The rear end structure of the vehicle body according to claim 6, wherein the brace has a plate shape.

9. The rear end structure of the vehicle body according to claim 1, wherein the brace has a plate shape.

10. The rear end structure of the vehicle body according to claim 9, wherein the brace is connected to the low floor portion and the bottom surface of the floor recess portion by fastening members, and wherein the brace in the plate shape includes a flange portion extended between fastening portions to the high floor portion side.

11. The rear end structure of the vehicle body according to claim 1, further comprising:

a rear stiffener forming a closed cross-section with the bottom surface of the floor recess portion to house a second fastening member, wherein the brace and the rear stiffener are fastened by the second fastening member.

12. The rear end structure of the vehicle body according to claim 1, wherein the floor panel includes a floor tunnel being extended at a central portion, in vehicle transverse direction, of the low floor portion and having an upward convex shape in a view along a vehicle front and rear direction, wherein the low floor portion is partitioned by the floor tunnel into a left low floor portion and a right low floor portion, wherein the brace comprises:

a tunnel brace connecting the left low floor portion and the right low floor portion;

a left brace connecting the left low floor portion and the bottom surface of the floor recess portion; and a right brace connecting the right low floor portion and the bottom surface of the floor recess portion, and wherein the left brace and the right brace are disposed left-right symmetric.

13. A rear end structure of a vehicle body, comprising:

a floor panel including a low floor portion, a high floor portion provided rearward of the low floor portion, and a floor recess portion formed on the high floor portion and having a downward convex shape in a view in a vehicle longitudinal direction; and a brace connecting the low floor portion and a bottom surface of the floor recess portion wherein the floor panel includes a floor tunnel being extended at a central portion, in vehicle transverse direction, of the low floor portion and having an upward convex shape in a view along a vehicle front and rear direction, wherein the low floor portion is partitioned by the floor tunnel into a left low floor portion and a right low floor portion, wherein the brace comprises:

a tunnel brace connecting the left low floor portion and the right low floor portion;

a left brace connecting the left low floor portion and the bottom surface of the floor recess portion; and a right brace connecting the right low floor portion and the bottom surface of the floor recess portion, wherein the left brace and the right brace are disposed left-right symmetric, wherein the brace has a triangle truss shape in integration of the tunnel brace, the left brace, and the right brace, and wherein corners of the triangle truss shape are connected respectively to a right rear end portion of the left low floor portion, a left rear end portion of the right low floor portion, and a front end portion of the bottom surface of the floor recess portion.

14. The rear end structure of the vehicle body according to claim 13, wherein the brace has a plate shape.

15. A rear end structure of a vehicle body, comprising:

a floor panel including a low floor portion, a high floor portion provided rearward of the low floor portion, and a floor recess portion formed on the high floor portion and having a downward convex shape in a view in a vehicle longitudinal direction;

a front stiffener; and a brace connecting the low floor portion and a bottom surface of the floor recess portion;

wherein the low floor portion, the brace, and the bottom surface of the floor recess portion are disposed at the same height in a view from a side of the vehicle body and substantially linearly, wherein the floor panel includes a step portion formed at a rear end portion of the low floor portion, and located higher than the low floor portion and lower than the high floor portion, wherein the front stiffener includes a fastening portion disposed at the same height as the low floor portion and forming a closed cross-section with the step portion to house a fastening member, and wherein the brace and the fastening portion of the front stiffener are fastened by the fastening member.

* * * * *